L. Read,
Wood Planing Machine.
No. 64,706. Patented May 14, 1867.
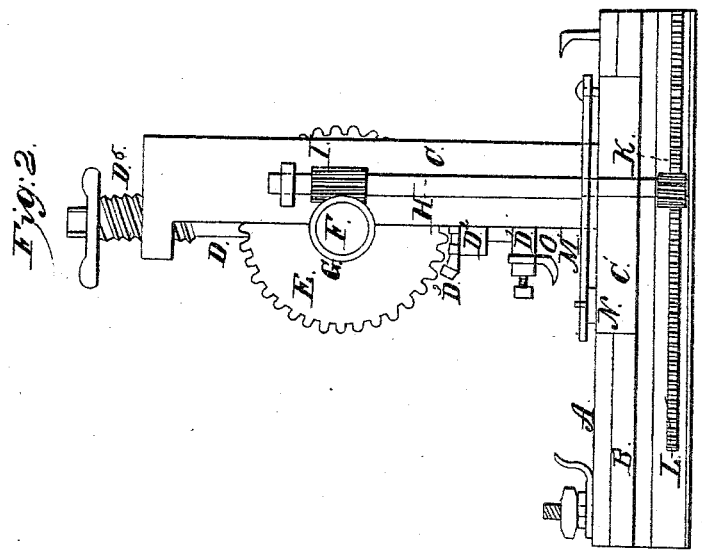
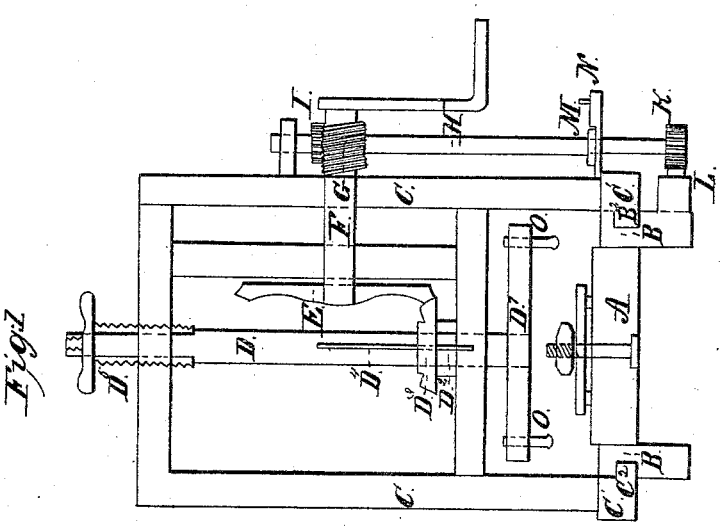
Witnesses:
John G. Bucher
Orsan S. Goston
Inventor
Lemuel Read

United States Patent Office.

LEMUEL READ, OF NORTH BROOKFIELD, NEW YORK.

*Letters Patent No. 64,706, dated May 14, 1867.*

IMPROVEMENT IN PLANING MACHINES.

*The Schedule referred to in these Letters Patent and making part of the same.*

TO ALL WHOM IT MAY CONCERN:

Be it known that I, LEMUEL READ, of North Brookfield, in the county of Madison, and State of New York, have invented a new and useful Improvement in Rotary or Disk Planing Machines.

The nature of my invention consists in so arranging and combining the parts of a rotary disk planing machine that the bed remains stationary while the cutters advance over the work, by means of which a cheap, serviceable machine is obtained, and which requires but little more floor room than the piece to be planed; and I do hereby declare that the following is a full, clear, and exact description of the same, reference being had to the annexed drawings making a part of this specification, in which—

Figure 1 represents a sectional view of the machine; and

Figure 2 a side view or elevation thereof.

A is the bed. B B is a groove on each side, in which the frame carrying the cutters moves forward and backward over the bed. C is the said frame. On its lower end, and on each side, is a bar running longitudinally, $C^1$, on which is the tongue $C^2$, which is fitted to and slides in the grooves B B. D is the rotating shaft, running vertically through the centre of the frame C. $D^1$ is the plane or cutter-stock; it is firmly attached to the lower end of the shaft D. $D^2$ is a collar on said shaft. $D^3$ is a small bevelled gear resting on said collar $D^2$. $D^4$ is a key seat in said shaft. The key being fitted loose, allows said shaft to pass up and down through said bevelled gear, but prevents it turning. $D^5$ is a large screw on the upper end of the shaft, working in the frame C, and turning freely on said shaft; it is held on the shaft by a nut at the top. This screw, $D^5$, serves to raise and lower the planes or cutters, and set them to the work. E is a larger bevelled wheel gearing into $D^3$. F is a crank, to the inner end of which said E is attached. G is an endless screw on the crank F. H is a shaft conveying power from the crank, by means of the two stud-wheels or pinions, to a rack on the side of the bed, by means of which the frame with the cutters is moved. I is one of said gears or pinions, and meshes into said endless screw G. K is the other pinion which meshes in the rack L on the side of the bed. M is a lever, on which the shaft H rests, by means of a shoulder thereon, and is kept in place by N, a bar with a notch or stop and a pin thereon. When the machine is operating, the lever M is kept in place by said stop. By raising M out of the notch and turning it sideways towards the pin, the lower pinion is thrown out of gearing and the frame may readily be run back. O O are planes or cutters, held in place by screws in the plane-stock. The bed A and frame C may be of wood or metal. The other parts should be of metal.

The mode of operation is as follows: The work to be planed is attached to the bed by the dogs, and the frame C drawn back to the rear end. The planes or cutters are then set by turning the screw $D^5$, and the lever M is placed against the stop on the bar N. Now turn the crank F, and the cutters O O revolve horizontally by means of gearing $D^3$ and E. The planes cut transversely, and as they perform their work, the frame C with the cutters is driven forward by means of the rack and pinion K and L, through the shaft H and the pinion I and worm G. When the cutters have traversed the length of the work, the lever M may be thrown out of the slot on the bar N, which withdraws the pinion K from the rack L, and the frame may be slipped back readily.

The advantages of this machine are, its simplicity and cheapness, and the ease with which it may be worked, and the little space it occupies.

Instead of moving the frame at the side in the manner described, the rack may be in the centre below the bed, and the pinion turned by bevelled gearing, connecting with the shaft H, or an endless chain or belt may be used in the centre under the bed, moved by a pulley in place of the rack and pinion, or the frame may be moved by an endless screw to which motion may be given by bevelled gearing from the crank. A rack and pinion may also be placed on both sides to equalize the draught, and the frame may be carried forward by a strap and weight. All of these are well-known mechanical modes of effecting the desired purpose, and need not be more fully described.

What I claim as my invention, and desire to secure by Letters Patent, is—

*Claim.*

In a rotary planing machine, moving the cutters over the material operated on, instead of the said material under the cutters, by means of the crank F, pinion I, and rack L, pinion K, and sliding-frame $C^1$, constructed and operating in combination substantially as described.

LEMUEL READ.

Witnesses:
H. D. ALEXANDER,
J. G. CROCKER.